(12) United States Patent
Morimoto et al.

(10) Patent No.: US 12,036,995 B2
(45) Date of Patent: Jul. 16, 2024

(54) VEHICLE CONTROL CALCULATION DEVICE, VEHICLE CONTROL APPARATUS, AND VEHICLE CONTROL CALCULATION METHOD

(71) Applicant: Mitsubishi Electric Corporation, Tokyo (JP)

(72) Inventors: Takuji Morimoto, Tokyo (JP); Yoshihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 131 days.

(21) Appl. No.: 17/432,546

(22) PCT Filed: Mar. 27, 2019

(86) PCT No.: PCT/JP2019/013298
§ 371 (c)(1),
(2) Date: Aug. 20, 2021

(87) PCT Pub. No.: WO2020/194589
PCT Pub. Date: Oct. 1, 2020

(65) Prior Publication Data
US 2022/0144282 A1    May 12, 2022

(51) Int. Cl.
*B60W 40/00* (2006.01)
*B60W 40/02* (2006.01)
(Continued)

(52) U.S. Cl.
CPC .......... *B60W 40/02* (2013.01); *B60W 50/045* (2013.01); *G05B 13/027* (2013.01); *B60W 2420/403* (2013.01); *B60W 2420/408* (2024.01)

(58) Field of Classification Search
CPC ............... B60W 40/02; B60W 50/045; B60W 2420/42; B60W 2420/52; G05B 13/027
(Continued)

(56) References Cited

U.S. PATENT DOCUMENTS

2020/0083080 A1*  3/2020  Clark ................ H01L 21/28562
2021/0403015 A1* 12/2021  Kato ........................ G08G 1/16

FOREIGN PATENT DOCUMENTS

JP           2018-169959 A    11/2018

* cited by examiner

*Primary Examiner* — Tiffany P Young
(74) *Attorney, Agent, or Firm* — Sughrue Mion, PLLC; Richard C. Turner

(57) ABSTRACT

An environmental information acquiring unit for acquiring one or more pieces of environmental information, an important information specifying unit for specifying important environmental information among the pieces of environmental information acquired by the environmental information acquiring unit, a calculation unit for performing a calculation related to control of a vehicle on the basis of the pieces of environmental information acquired by the environmental information acquiring unit, and a trained model in machine learning, a contribution information specifying unit for specifying contribution environmental information among the pieces of environmental information used for the calculation by the calculation unit, and a reliability determination unit for determining a degree of reliability of a result of the calculation performed by the calculation unit by comparing the important environmental information specified by the important information specifying unit with the contribution environmental information specified by the contribution information specifying unit are provided.

12 Claims, 7 Drawing Sheets

(51) Int. Cl.
*B60W 50/04* (2006.01)
*G05B 13/02* (2006.01)

(58) Field of Classification Search
USPC .......................................................... 701/117
See application file for complete search history.

VEHICLE CONTROL CALCULATION DEVICE, VEHICLE CONTROL APPARATUS, AND VEHICLE CONTROL CALCULATION METHOD

CROSS REFERENCE TO RELATED APPLICATIONS

This application is a National Stage of International Application No. PCT/JP2019/013298 filed Mar. 27, 2019.

TECHNICAL FIELD

The present invention relates to a vehicle control calculation device that performs calculation for controlling a vehicle, a vehicle control apparatus that controls a vehicle in accordance with the result of calculation by the vehicle control calculation device, and a vehicle control calculation method of performing calculation for controlling a vehicle.

BACKGROUND ART

In recent years, the number of vehicle control systems that control vehicles on the basis of a trained model in machine learning (hereinafter, simply referred to as a "model") is increasing.

On the other hand, with regard to machine learning, since the accuracy of the machine learning largely depends on the amount or quality of training data in addition to the algorithm, the training data has been devised in the past. For example, Patent Literature 1 discloses a technique for calculating a degree of contribution of each input item used for model creation to an output result and generating a high contribution item data set on the basis of high contribution input items.

CITATION LIST

Patent Literature

Patent Literature 1: JP 2018-169959 A

SUMMARY OF INVENTION

Technical Problem

Even if the training data or the like is improved by the conventional technique represented by the technique disclosed in Patent Literature 1, there is no guarantee that the calculation result at the time of actual calculation based on a model created by using the training data or the like is appropriate.

Therefore, when a vehicle is controlled on the basis of a model, there has been a problem that there is a possibility that improper vehicle control based on an inappropriate calculation result is performed.

The present invention has been made to solve the above problem, and has an object to provide a vehicle control calculation device capable of determining whether or not the calculation result based on a model is reliable for use in vehicle control.

Solution to Problem

The vehicle control calculation device according to the present invention includes processing circuitry to acquire at least one group of one or more pieces of environmental information on an environment around a vehicle, to specify important environmental information necessary for control of the vehicle among the pieces of environmental information acquired, to perform a calculation related to the control of the vehicle on the basis of the pieces of environmental information acquired, and a trained model in which machine learning for outputting a calculation result related to the control of the vehicle has been performed in advance using preliminarily acquired environmental information as an input, to specify contribution environmental information having a high degree of contribution to the calculation in a process of the calculation among the pieces of environmental information used for the calculation, and to determine a degree of reliability of a result of the calculation by comparing the important environmental information specified with the contribution environmental information specified.

Advantageous Effects of Invention

According to the present invention, it is possible to determine whether or not the calculation result based on the model is reliable for use in vehicle control.

DESCRIPTION OF EMBODIMENTS

Hereinafter, an embodiment of the present invention will be described in detail with reference to the drawings.

First Embodiment

Figure 1:
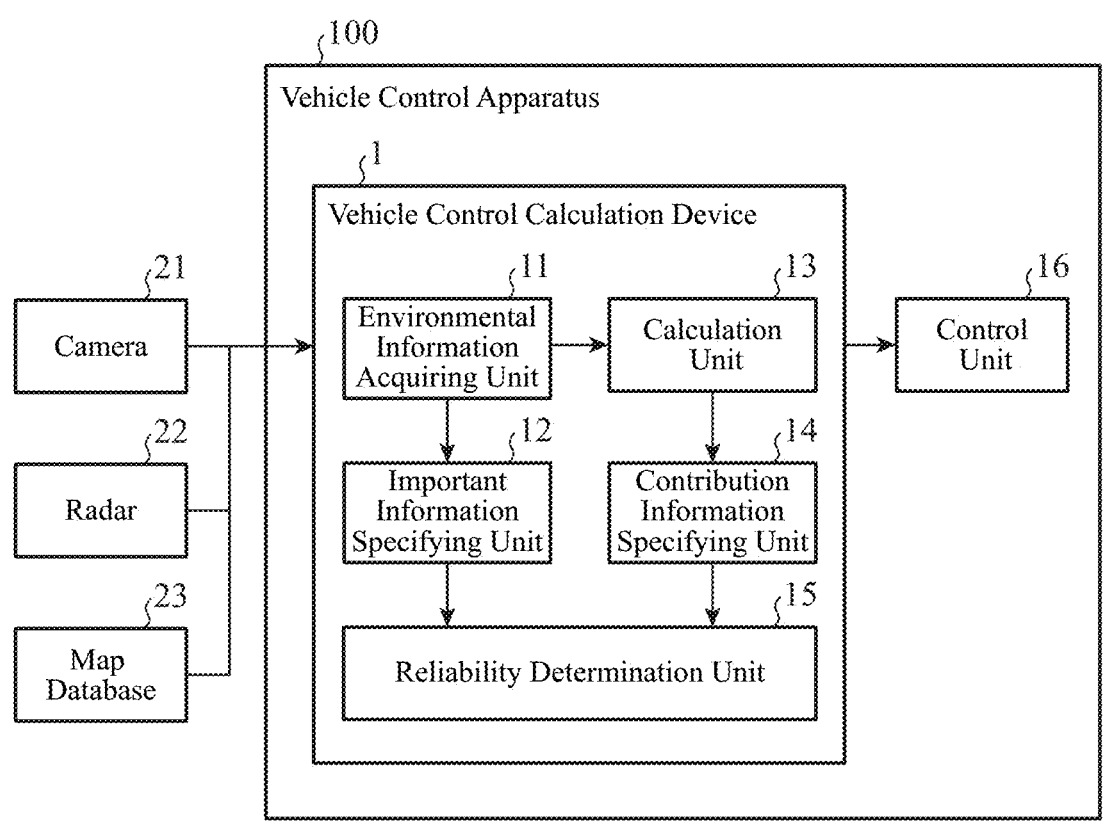
FIG. 1 is a diagram showing a configuration example of a vehicle control apparatus including a vehicle control calculation device according to a first embodiment.

FIG. 1 is a diagram showing a configuration example of a vehicle control apparatus 100 including a vehicle control calculation device 1 according to a first embodiment.

The vehicle control apparatus 100 is mounted on a vehicle and controls the vehicle. As shown in FIG. 1, the vehicle control apparatus 100 includes the vehicle control calculation device 1 and a control unit 16.

The vehicle control apparatus 100 can perform calculation related to vehicle control on the basis of a model. Here, the "model" is a trained model in machine learning as described above. More specifically, in the first embodiment, the "model" is a trained model in which machine learning for outputting a calculation result related to the vehicle control by using environmental information as an input has been performed. Details of the environmental information will be described later. In the vehicle control apparatus 100, the vehicle control calculation device 1 performs calculation related to vehicle control based on the model. Further, the vehicle control calculation device 1 determines a degree of reliability of a result of the calculation based on the model (hereinafter referred to as "calculation result"). The control unit 16 of the vehicle control apparatus 100 controls the vehicle in accordance with the calculation result and the degree of reliability determined by the vehicle control calculation device 1.

In the following first embodiment, as an example, it is assumed that the vehicle control calculation device 1 can perform calculation for setting a vehicle speed on the basis of a model, and the vehicle control apparatus 100 can set the vehicle speed by using the calculation result. More specifically, the vehicle control calculation device 1 performs calculation for setting the vehicle speed on the basis of the model, and determines the degree of reliability of the calculation result. When the degree of reliability determined by the vehicle control calculation device 1 is equal to or higher than a preset threshold value, the control unit 16 of the vehicle control apparatus 100 sets the vehicle speed in accordance with the calculation result. Note that, if the degree of reliability determined by the vehicle control calculation device 1 is less than the preset threshold value, the control unit 16 of the vehicle control apparatus 100 omits to set the vehicle speed in accordance with the calculation result. In this case, for example, another vehicle control unit (not shown) provided in the vehicle sets the vehicle speed. The vehicle control unit may be provided in the vehicle control apparatus 100, or may be provided in a place which is outside the vehicle control apparatus 100 and where communication with the vehicle control apparatus 100 is possible. The vehicle control unit can control the vehicle without using the calculation result based on the model.

As shown in FIG. 1, the vehicle control calculation device 1 includes an environmental information acquiring unit 11, an important information specifying unit 12, a calculation unit 13, a contribution information specifying unit 14, and a reliability determination unit 15.

The environmental information acquiring unit 11 acquires environmental information on an environment around the vehicle from a camera 21 mounted on the vehicle, a radar 22 mounted on the vehicle, or a map database 23 mounted on the vehicle.

In the first embodiment, the environmental information includes, for example, host vehicle information, different vehicle information, pedestrian information, road information, or obstacle information. The host vehicle information includes, for example, speed information, acceleration information, position information, or shape information of the host vehicle, or information on a traveling lane in which the host vehicle is currently traveling. The different vehicle information includes, for example, speed information, position information, or shape information of a different vehicle present around the host vehicle, or information on a traveling lane in which the different vehicle is currently traveling. The pedestrian information includes, for example, speed information, position information, or shape information of a pedestrian present around the host vehicle. The road information includes, for example, information on the number of lanes of the road present around the host vehicle, type information of the road, shape information of the road, information on a traffic signal on the road, information on a traffic sign on the road, or information on a road marking. The obstacle information includes, for example, speed information, position information, or shape information of an obstacle present around the host vehicle. The environmental information includes one or more of these pieces of information.

Note that, the above-mentioned type of the environmental information is only an example, and the environmental information includes all kinds of information on the environment around the vehicle controlled by the vehicle control apparatus 100.

The environmental information acquiring unit 11 can acquire the environmental information from, for example, an image taken by the camera 21, a measured value measured by the radar 22, or map data held by the map database 23, depending on the type of the environmental information. Further, the environmental information acquiring unit 11 can also acquire the environmental information from various in-vehicle devices (not shown) other than the camera 21, the radar 22, and the map database 23, depending on the type of the environmental information.

The environmental information acquiring unit 11 outputs the acquired environmental information to the important information specifying unit 12 and the calculation unit 13.

Among the environmental information acquired by the environmental information acquiring unit 11, the important information specifying unit 12 specifies environmental information necessary for vehicle control that the vehicle control apparatus 100 intends to perform in accordance with the calculation result based on the model (hereinafter referred to as "important environmental information"). In other words, the important information specifying unit 12 specifies the environmental information that should be considered in order for the calculation unit 13 (details will be described later) to properly perform the calculation related to the vehicle control among the environmental information as the important environmental information. Here, the important information specifying unit 12 specifies environmental information that should be considered in order to set the vehicle speed.

The important information specifying unit 12 can specify the above-mentioned important environmental information by any method. To give a specific example, for example, the important information specifying unit 12 specifies important environmental information on the basis of a logic that "vehicles and pedestrians within $d_1$ m in the vicinity and a traffic light in the traveling direction are specified as important environmental information". The logic used by the important information specifying unit 12 to specify important environmental information is set in advance by the developer.

Note that, the important information specifying unit 12 may, for example, specify important environmental information in the form of two values of "being important environmental information" and "not being important environmental information" for each piece of information included in the environmental information, on the basis of a rule set in advance by the developer or the like. Further, for example, the important information specifying unit 12 may specify important environmental information in the form of a numerical value such as "importance of x %" for each piece of information included in the environmental information on the basis of a rule set in advance by the developer or the like.

The important information specifying unit 12 outputs the specified important environmental information to the reliability determination unit 15.

The calculation unit 13 performs calculation related to vehicle control on the basis of the environmental information acquired by the environmental information acquiring unit 11 and the model. Here, the calculation unit 13 performs calculation for setting the vehicle speed. As the model used by the calculation unit 13, any model can be used as long as the calculation related to vehicle control can be performed on the basis of the model.

The calculation unit 13 outputs the calculation result based on the model to the contribution information specifying unit 14 and the control unit 16.

Among the environmental information used for the calculation by the calculation unit 13, the contribution information specifying unit 14 specifies environmental information having a high degree of contribution to the calculation in the process of the calculation (hereinafter referred to as "contribution environmental information").

In the first embodiment, the "degree of contribution" means the degree of influence of the environmental information on the calculation result based on the model.

The contribution information specifying unit 14 can, for example, calculate the degree of contribution by using a method generally known in the field of machine learning and thereby specify the contribution environmental information.

For example, when the calculation unit 13 uses a model obtained as a result of machine learning by a neural network, the contribution information specifying unit 14 can calculate a degree of contribution of certain specific environmental information by using the change in the calculation result when the environmental information is slightly changed. Further, for example, the contribution information specifying unit 14 can specify the contribution environmental information, by calculating the degree of contribution of each piece of environmental information using a method of back-calculating the value propagating in the neural network toward the input direction of the environmental information and thereby calculating environmental information that contributes to the calculation result based on the model.

The contribution information specifying unit 14 may specify the contribution environmental information by attaching one of two values of "being contribution environmental information" and "not being contribution environmental information" to each piece of information included in the environmental information on the basis of a rule set in advance by the developer or the like.

In addition, the contribution information specifying unit 14 may specify the contribution environmental information by attaching a numerical value such as "degree of contribution of y %" to each piece of information included in the environmental information on the basis of a rule set in advance by the developer or the like.

The contribution information specifying unit 14 outputs the specified contribution environmental information to the reliability determination unit 15.

The reliability determination unit 15 determines a degree of reliability of the calculation result output by the calculation unit 13 by comparing the important environmental information specified by the important information specifying unit 12 with the contribution environmental information specified by the contribution information specifying unit 14.

The reliability determination unit 15 acquires the calculation result output by the calculation unit 13 via the contribution information specifying unit 14. Note that this is only an example, and the reliability determination unit 15 may acquire the calculation result directly from the calculation unit 13.

The reliability determination unit 15 can determine a degree of reliability of the calculation result by a method according to the needs. The reliability determination unit 15 may determine a degree of reliability as a classification such as "high" or "low", or as a numerical value such as "a degree of reliability of z %".

Specifically, for example, in a case where both the important environmental information and the contribution environmental information are specified in the form of two values, if all pieces of information that is specified as "being important environmental information" are included in the information that is specified as "being contribution environmental information", the reliability determination unit 15 determines that the calculation unit 13 performs the calculation in consideration of the important environmental information, and determines that the degree of reliability is "high". On the other hand, if any one of the pieces of the information that is specified as "being important environmental information" is not included in the information that is specified as "being contribution environmental information", the reliability determination unit 15 determines that the degree of reliability is "low". The reliability determination unit 15 can also determine the degree of reliability by calculating the ratio of the information included in the information that is specified as "being contribution environmental information" among the information that is specified as "being important environmental information" instead of determining the degree of reliability in the form of two values of "high" and "low".

Further, for example, in a case where both the important environmental information and the contribution environmental information are specified in the form of numerical values, the reliability determination unit 15 may determine the degree of reliability by calculating the degree of agreement of the numerical value of each piece of the important environmental information with the numerical value of the piece of the contribution environmental information corresponding to the piece of the important environmental information for all pieces of the important environmental information. In this case as well, the reliability determination unit 15 can specify the degree of reliability in the form of two values of "high" and "low", or can determine it as a numerical value such as "a degree of reliability of z %".

The reliability determination unit 15 outputs information indicating the determined degree of reliability to the control unit 16.

The control unit 16 controls the vehicle on the basis of the result of the calculation performed by the calculation unit 13 and the degree of reliability determined by the reliability determination unit 15. Here, the control unit 16 sets the vehicle speed in accordance with the calculation result output by the calculation unit 13 and the degree of reliability determined by the reliability determination unit 15. Note that, here, it is assumed that the control unit 16 directly acquires the calculation result output by the calculation unit 13 from the calculation unit 13, but this is only an example, and the control unit 16 may acquire the calculation result via the reliability determination unit 15.

Specifically, for example, it is assumed that the reliability determination unit 15 determines the degree of reliability in the form of two values of "high" and "low". When the degree of reliability of the calculation result is determined to be "high", the control unit 16 sets the vehicle speed in accordance with the calculation result. On the other hand, when the degree of reliability of the calculation result is determined to be "low", the control unit 16 omits to set the vehicle speed in accordance with the calculation result. When the control unit 16 omits to set the vehicle speed in accordance with the calculation result, the vehicle control unit (not shown) sets the vehicle speed, as described above, by another means that does not use the calculation result.

Further, for example, it is assumed that the reliability determination unit 15 determines the degree of reliability in the form of a numerical value. When the degree of reliability of the calculation result is equal to or higher than a preset threshold value, the control unit 16 sets the vehicle speed in accordance with the calculation result. On the other hand, when the degree of reliability of the calculation result is less than the preset threshold value, the control unit 16 omits to set the vehicle speed in accordance with the calculation result. When the control unit 16 omits to set the vehicle speed in accordance with the calculation result, the vehicle control unit (not shown) sets the vehicle speed, as described above, by another means that does not use the calculation result.

The operation of the vehicle control calculation device 1 according to the first embodiment will be described.

Figure 2:
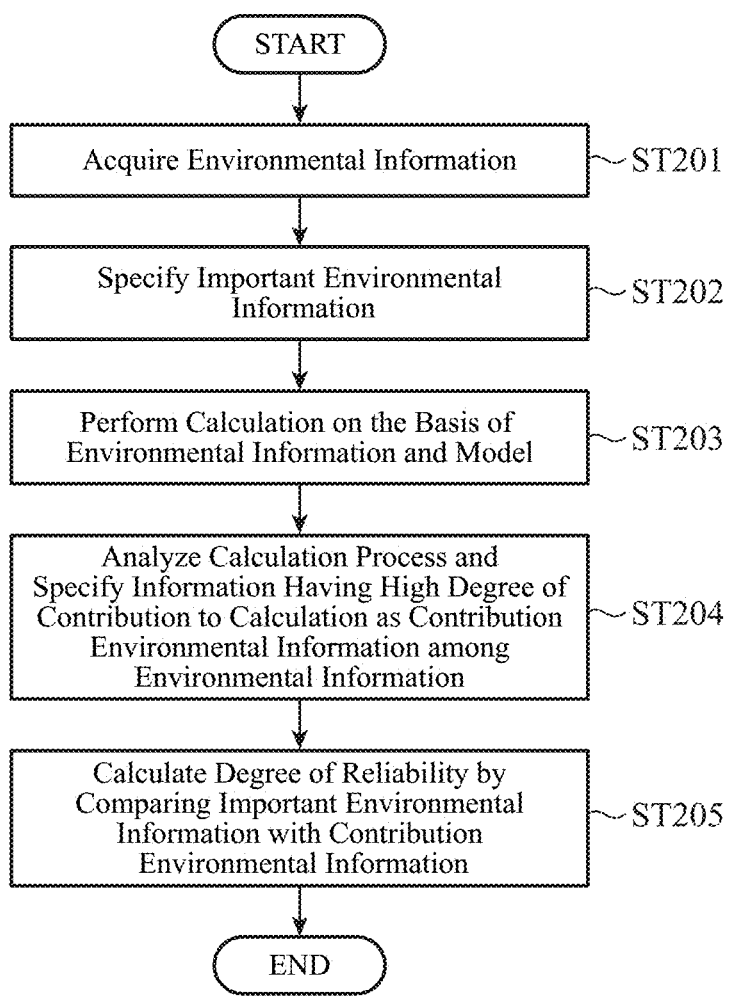
FIG. 2 is a flowchart for explaining an operation of the vehicle control calculation device according to the first embodiment.

FIG. 2 is a flowchart for explaining the operation of the vehicle control calculation device 1 according to the first embodiment.

Figure 3:
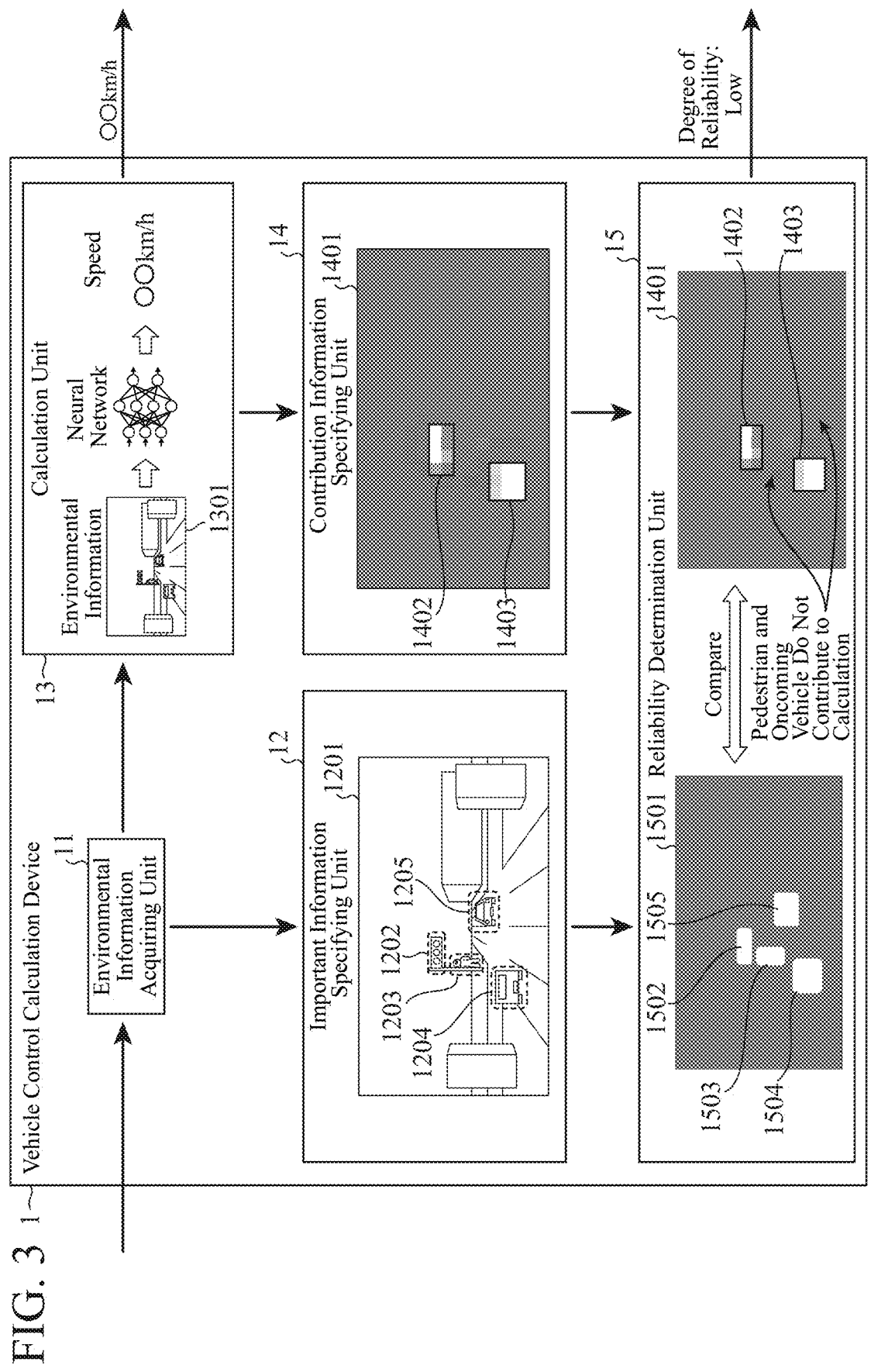
FIG. 3 is a diagram showing an example of environmental information in the vehicle control calculation device according to the first embodiment.

FIG. 3 is a diagram showing an example of environmental information in the vehicle control calculation device 1 according to the first embodiment. Hereinafter, the operation shown in the flowchart of FIG. 2 will be described appropriately with reference to FIG. 3.

The environmental information acquiring unit 11 acquires environmental information (step ST201). In this description, it is assumed that the environmental information is obtained from an image taken by the camera 21. FIG. 3 shows an example of an image taken by the camera 21. As shown in FIG. 3, from this image, as different vehicle information, for example, position information or shape information of different vehicles present around the host vehicle, or information on traveling lanes in which the different vehicles are currently traveling can be obtained. Further, from the image, as pedestrian information, for example, position information or shape information of a pedestrian present around the host vehicle can be obtained. Further, from the image, as road information, for example, information on the number of lanes or shape information of the road present around the host vehicle, or information on a traffic signal on the road can be obtained. Further, from the image, as obstacle information, for example, position information or shape information of buildings that are obstacles present around the host vehicle can be obtained.

The environmental information acquiring unit 11 outputs the acquired environmental information to the important information specifying unit 12 and the calculation unit 13.

The important information specifying unit 12 specifies important environmental information (step ST202).

For example, as shown in FIG. 3, the important information specifying unit 12 specifies a front traffic signal 1202, a pedestrian 1203, a front traveling vehicle 1204, and an oncoming vehicle 1205 on the image as important environmental information that should be considered in order for the calculation unit 13 to properly perform the calculation related to vehicle control among the environmental information. The image in which the important environmental information is specified by the important information specifying unit 12 is represented as an important environmental information image 1201 in FIG. 3.

The important information specifying unit 12 outputs the specified important environmental information to the reliability determination unit 15.

The calculation unit 13 performs calculation related to vehicle control on the basis of the environmental information acquired by the environmental information acquiring unit 11 in step ST201 and the model (step ST203). That is, here, the calculation unit 13 performs calculation for setting the vehicle speed.

For example, as shown in FIG. 3, the calculation unit 13 calculates the speed to be set on the basis of the model using the neural network and an image 1301 including the environmental information.

The calculation unit 13 outputs the calculation result to the contribution information specifying unit 14 and the control unit 16. Note that in FIG. 3, the control unit 16 is not shown.

The contribution information specifying unit 14 specifies the contribution environmental information having a high degree of contribution to the calculation in the process of the calculation among the environmental information used for the calculation by the calculation unit 13 in step ST203 (step ST204).

Here, it is assumed that the contribution information specifying unit 14 analyzes the calculation process of the calculation unit 13 to thereby expresses the degree of contribution of each pixel of the image 1301 by a luminance value, and specifies the contribution environmental information on the basis of the degree of contribution.

For example, a contribution environmental information image 1401 shown in FIG. 3 is an image in which the degree of contribution of each pixel of the image 1301 is represented by a luminance value. In the contribution environmental information image 1401, among a plurality of pixels constituting the image 1301, the pixel having a higher degree of contribution has a higher luminance value and is therefore expressed in whiter. That is, the contribution environmental information image 1401 shows that when a pixel has a higher luminance value, in other words, the pixel is whiter, the corresponding pixel in the image 1301 has a higher degree of contribution. In the contribution environmental information image 1401, the contribution information specifying unit 14 specifies a pixel having a luminance value equal to or higher than a preset threshold value as the contribution environmental information. FIG. 3 shows that the pixels included in areas 1402 and 1403 on the contribution environmental information image 1401 are specified as the contribution environmental information.

The contribution information specifying unit 14 outputs the specified contribution environmental information to the reliability determination unit 15.

The reliability determination unit 15 compares the important environmental information specified by the important information specifying unit 12 in step ST202 with the contribution environmental information specified by the contribution information specifying unit 14 in step ST204, and thereby determines a degree of reliability of the calculation result output by the calculation unit 13 in step ST203 (step ST205).

Here, it is assumed that the reliability determination unit 15 determines whether the degree of reliability is "high" or "low" depending on whether or not all pieces of information included in the important environmental information are included in the contribution environmental information.

First, the reliability determination unit 15 expresses the important environmental information image 1201 in the form of the same image as the contribution environmental information image 1401 for comparison. Specifically, the reliability determination unit 15 generates an image in which the pixels corresponding to the environmental information specified as the important environmental information among the pixels of the important environmental information image 1201 are expressed in white, as an important environmental information image for comparison 1501 to be compared with the contribution environmental information image 1401. FIG. 3 shows that the pixels included in areas 1502 to 1505 in the important environmental information image for comparison 1501 are the pixels specified as the important environmental information. The pixels included in the area 1502 are the pixels corresponding to the front traffic signal 1202 in the important environmental information image 1201, and the pixels included in the area 1503 are the pixels corresponding to the pedestrian 1203 in the important environmental information image 1201. Further, the pixels included in the area 1504 are the pixels corresponding to the front traveling vehicle 1204 in the important environmental information image 1201, and the pixels included in the area 1505 are the pixels corresponding to the oncoming vehicle 1205 in the important environmental information image 1201.

Next, the reliability determination unit 15 compares the important environmental information image for comparison 1501 with the contribution environmental information image 1401 on a pixel-by-pixel basis, and thereby determines the degree of reliability on the basis of presence or absence of a difference.

Now, there is a difference by the pixels corresponding to the pedestrian 1203 and the oncoming vehicle 1205 between the contribution environmental information image 1401 and the important environmental information image for comparison 1501, and the pixels in the important environmental information image for comparison 1501 which correspond to the pedestrian 1203 and the oncoming vehicle 1205 are not specified as the contribution environmental information on the contribution environmental information image 1401. This means that some pieces of information included in the important environmental information are not included in the contribution environmental information.

Therefore, the reliability determination unit 15 determines that the degree of reliability is "low". It can be said that there is a high possibility that the calculation unit 13 has set the speed without considering pedestrians and oncoming vehicles, and output information on the speed as a calculation result.

The reliability determination unit 15 outputs information indicating the determined degree of reliability to the control unit 16.

Here, the reliability determination unit 15 outputs information indicating that the degree of reliability is "low" to the control unit 16.

Note that, in the above description of the flowchart of FIG. 2, the vehicle control calculation device 1 operates in the order of step ST201 to step ST205, but no limitation thereto is intended, and the order of step ST202 and step ST203 may be interchanged, or step ST202 and step ST203 may be performed in parallel.

As described above, conventionally, a technique of generating a high contribution item data set on the basis of high contribution input items and creating a model using the data set as training data has been known. However, the behavior of the model depends on the input data, and thus there is no guarantee that the calculation result based on the model is appropriate. Therefore, when the vehicle is controlled on the basis of the model, there has been a possibility that improper vehicle control based on the inappropriate calculation result is performed. In particular, vehicle control is control that may affect a human life, and thus improper vehicle control must be avoided. Here, it is also conceivable that the appropriateness of the calculation result based on the model is monitored by using a logic separately created by a person such as a designer, and if the calculation result is determined to be inappropriate by the logic, the calculation result is not used because it is not reliable. However, limiting the calculation result based on the model by the logic created separately by a human being means that the original function of machine learning is limited by the logic created by a human being. Machine learning has the function of being able to perform calculations in accordance with a logic that a human being cannot think of, and this is one of the advantages of machine learning. The method of limiting the calculation result by the logic created by a human being impairs such advantage of machine learning.

On the other hand, the vehicle control calculation device 1 according to the first embodiment determines a degree of reliability of the calculation result depending on whether or not the environmental information used when performing the calculation related to vehicle control has been the important environmental information having a high importance in the vehicle control. The method of the first embodiment does not limit the calculation result by the logic created by a human being, but determines the necessity of using the calculation result in consideration of the appropriateness of the calculation process. This means that with the method of the first embodiment, even if the calculation result does not conform to the logic separately created by a human being, the calculation result may be used for control. Therefore, the method of the first embodiment does not impair the advantage of machine learning.

In the first embodiment, as an example, it has been presupposed that the control performed by the vehicle control apparatus 100 in accordance with the calculation result by the vehicle control calculation device 1 is only one type, which is vehicle speed setting, and the vehicle control calculation device 1 performs only one type of calculation for vehicle speed setting.

However, this is only an example, and in the first embodiment, the vehicle control calculation device 1 can perform a plurality of calculations for performing a respective plurality of types of control on the vehicle. Then, the vehicle control apparatus 100 can perform a plurality of types of control on the basis of the calculation results by the vehicle control calculation device 1 corresponding to the respective plurality of types of control.

Figure 4:
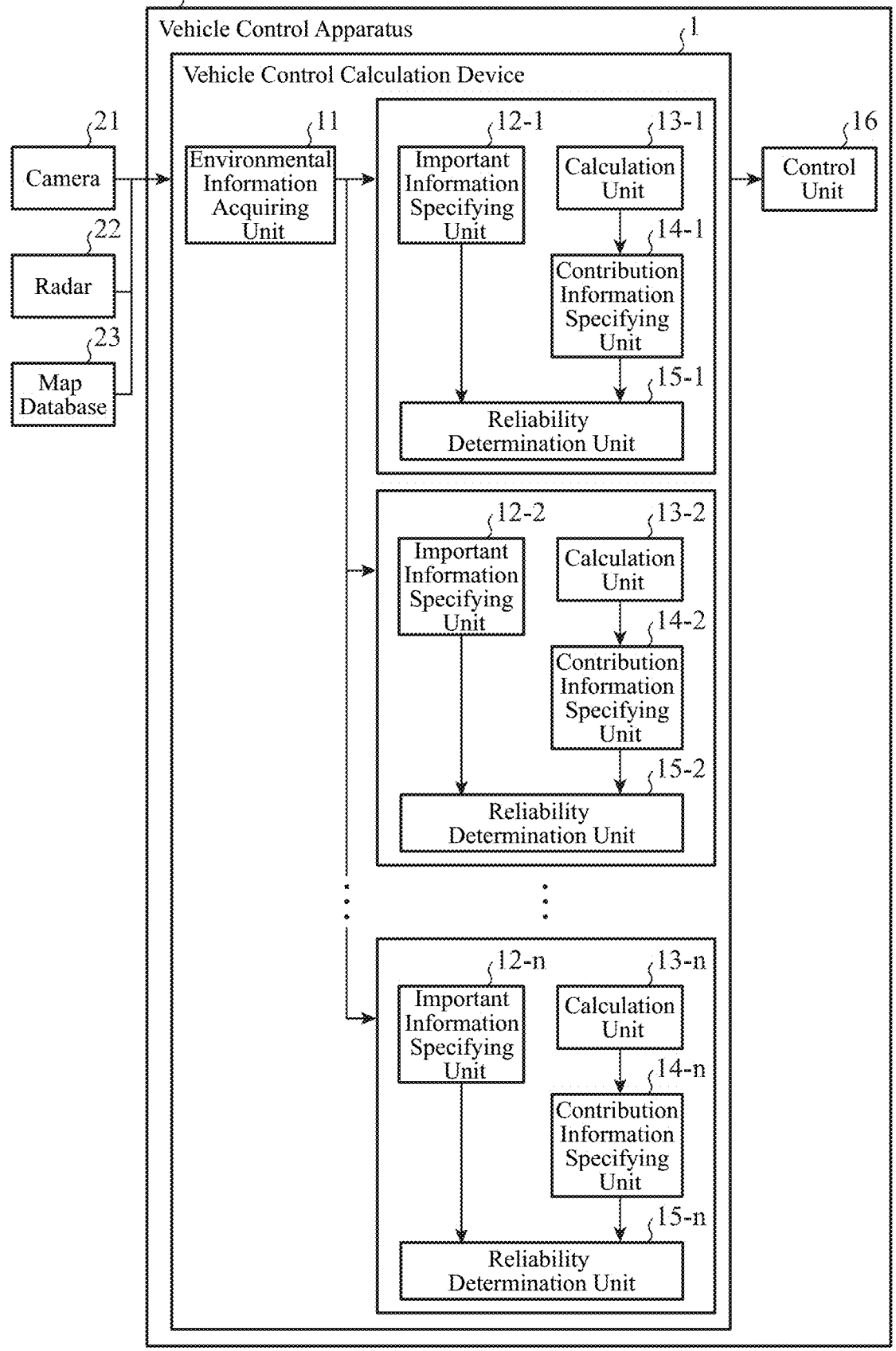
FIG. 4 is a diagram showing a configuration example of the vehicle control apparatus in which the vehicle control calculation device performs a plurality of calculations for performing a respective plurality of types of control on a vehicle in the first embodiment.

FIG. 4 is a diagram showing a configuration example of the vehicle control apparatus 100 in which the vehicle control calculation device 1 performs a plurality of calculations for performing a respective plurality of types of control on the vehicle in the first embodiment.

When the vehicle control apparatus 100 according to the first embodiment has the configuration shown in FIG. 4, the vehicle control apparatus 100 can perform a plurality of types of control on the basis of calculation results by the vehicle control calculation device 1 which correspond to the respective plurality of types of control.

FIG. 4 shows an example in which the vehicle control calculation device 1 includes, for one environmental information acquiring unit 11, a plurality of important information specifying units 12-1 to 12-n, a plurality of calculation units 13-1 to 13-*n*, a plurality of contribution information specifying units 14-1 to 14-*n*, and a plurality of reliability determination units 15-1 to 15-*n*. Note that, the specific operations of the environmental information acquiring unit 11, the important information specifying units 12-1 to 12-*n*, the calculation units 13-1 to 13-*n*, the contribution information specifying units 14-1 to 14-*n*, and the reliability determination units 15-1 to 15-*n* are similar to the specific operations of the environmental information acquiring unit 11, the important information specifying unit 12, the calculation unit 13, the contribution information specifying unit 14, and the reliability determination unit 15, which are explained with reference to FIG. 1, and therefore duplicated explanation is omitted.

In the vehicle control calculation device 1 shown in FIG. 4, it is assumed that the environmental information acquiring unit 11 outputs environmental information of the same type to the important information specifying units 12-1 to 12-*n* and the calculation units 13-1 to 13-*n*.

The vehicle control calculation device 1 shown in FIG. 4 includes calculation units 13-1 to 13-*n* as many as the number of types of control performed by the vehicle control apparatus 100 in accordance with the calculation results based on the models, and includes important information specifying units 12-1 to 12-*n*, contribution information specifying units 14-1 to 14-*n*, and reliability determination units 15-1 to 15-*n* corresponding to the calculation units 13-1 to 13-*n*.

In this case, the calculation units 13-1 to 13-*n* perform, for respective controls performed by the vehicle control apparatus 100 in accordance with the calculation results based on the models, calculations related to the controls. Specifically, for example, it is assumed that the vehicle control apparatus 100 performs vehicle speed setting, ON/OFF control of a collision damage mitigation brake, and start determination of lane change in accordance with the calculation results based on the models. In this case, for example, the calculation unit 13-1 performs calculation related to the vehicle speed setting, the calculation unit 13-2 performs calculation related to the ON/OFF control of the collision damage mitigation brake, and the calculation unit 13-3 performs calculation related to the start determination of lane change. In this way, the calculation units 13-1 to 13-*n* perform, depending on respective types of calculation related to control, calculations on the basis of corresponding models. Therefore, in the vehicle control calculation device 1 shown in FIG. 4, a plurality of types of models are prepared corresponding to the respective calculations related to the plurality of types of control.

The important information specifying units 12-1 to 12-*n* specify important environmental information for respective calculations performed by the calculation units 13-1 to 13-*n*. In the above example, for example, the important information specifying unit 12-1 specifies the environmental information necessary for vehicle speed setting as the important environmental information, the important information specifying unit 12-2 specifies the environmental information necessary for ON/OFF control of the collision damage mitigation brake as the important environmental information, and the important information specifying unit 12-3 specifies the environmental information necessary for start determination of lane change as the important environmental information. At this time, the important information specifying units 12-1 to 12-3 may specify important environmental information by different methods for respective calculations performed by the corresponding calculation units 13-1 to 13-3.

For example, as described above, the important information specifying unit 12-1 specifies important environmental information for vehicle speed setting on the basis of a logic that "vehicles and pedestrians within $d_1$ m in the vicinity and a traffic light in the traveling direction are specified as important environmental information".

Further, for example, the important information specifying unit 12-2 specifies vehicles, pedestrians, and obstacles within $d_2$ m in front of the host vehicle as important environmental information for ON/OFF control of the collision damage mitigation brake. Note that, the important information specifying unit 12-2 determines a numerical value of "$d_2$" at $d_2$ m depending on the speed of the host vehicle.

Further, for example, the important information specifying unit 12-3 specifies vehicles within $d_3$ m behind the host vehicle or within $d_4$ m on the side of the host vehicle as the important environmental information for start determination of lane change. Note that, the important information specifying unit 12-3 determines a numerical value of "$d_3$" at $d_3$ m depending on the speed of the host vehicle, and determines a numerical value of "$d_4$" at $d_4$ m depending on the road width.

Each of the contribution information specifying units 14-1 to 14-*n* specifies the contribution environmental information from among the environmental information used for the calculation by the corresponding one of the calculation units 13-1 to 13-*n*.

Each of the reliability determination units 15-1 to 15-*n* compares the important environmental information specified by the corresponding one of the important information specifying units 12-1 to 12-*n* with the contribution environmental information specified by the corresponding one of the contribution information specifying units 14-1 to 14-*n*, and thereby determines the degree of reliability of the calculation result output by the corresponding one of the calculation units 13-1 to 13-*n*.

Even when the configuration of the vehicle control calculation device 1 is as shown in FIG. 4, the operation of the vehicle control calculation device 1 is the same as the operation described using the flowchart of FIG. 2, and therefore detailed description will be omitted.

In the vehicle control calculation device 1 as shown in FIG. 4, each of the important information specifying units 12-1 to 12-*n*, each of the calculation units 13-1 to 13-*n*, each of the contribution information specifying units 14-1 to 14-*n*, and each of the reliability determination units 15-1 to 15-*n* perform the operations of steps ST202 to ST205, individually.

Figure 5:
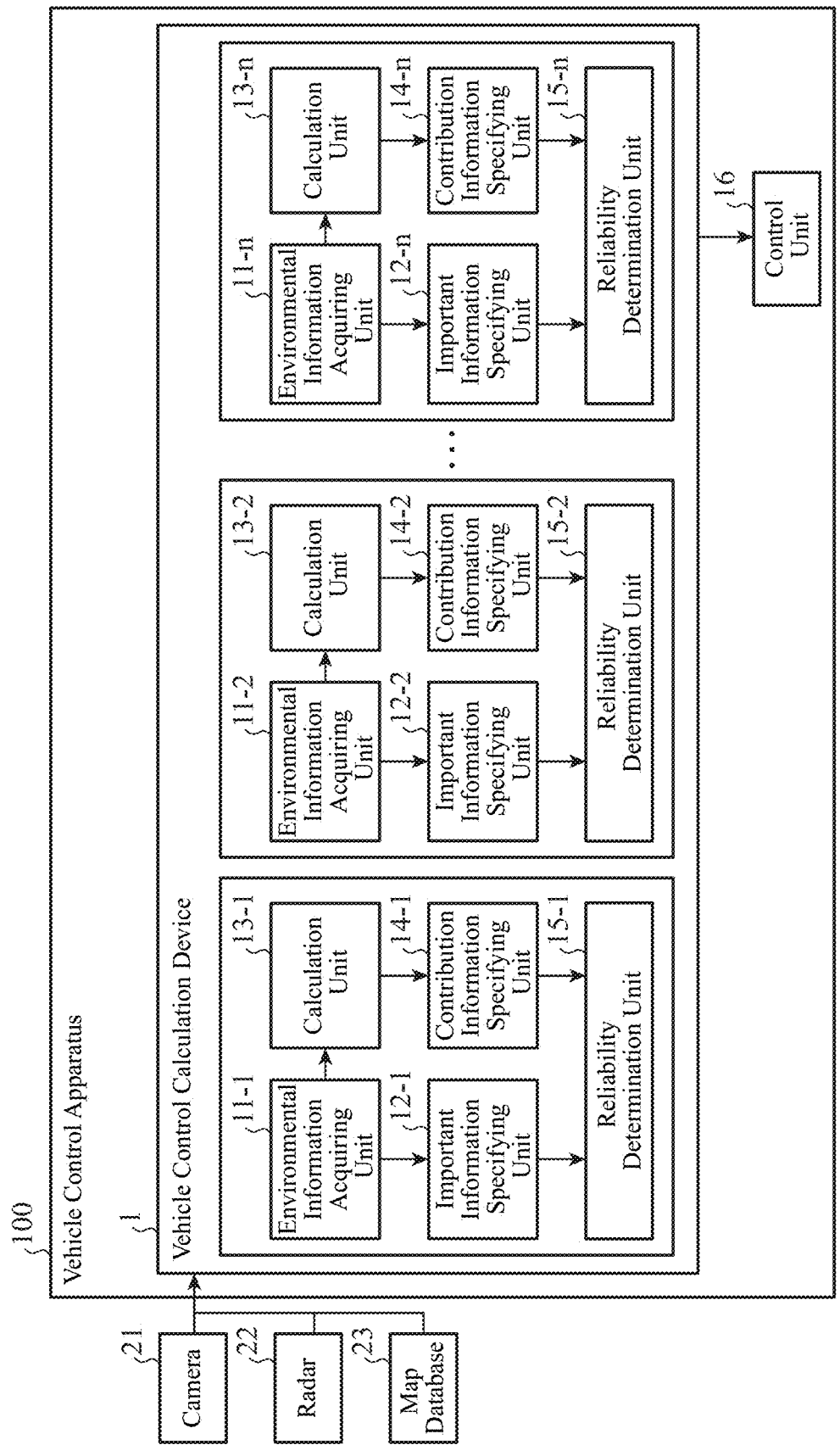
FIG. 5 is a diagram showing another configuration example of the vehicle control apparatus in which the vehicle control calculation device performs a plurality of calculations for performing a respective plurality of types of control on the vehicle in the first embodiment.

FIG. 5 is a diagram showing another configuration example of the vehicle control apparatus 100 in which the vehicle control calculation device 1 performs a plurality of calculations for performing a respective plurality of types of control on the vehicle in the first embodiment.

The vehicle control apparatus 100 according to the first embodiment can perform the plurality of types of control on the basis of calculation results by the vehicle control calculation device 1 which correspond to the respective plurality of types of control, even if the configuration is as shown in FIG. 5.

As shown in FIG. 5, the vehicle control calculation device 1 can include a plurality of sets of environmental information acquiring units 11-1 to 11-*n*, important information specifying units 12-1 to 12-*n*, calculation units 13-1 to 13-*n*, contribution information specifying units 14-1 to 14-*n*, and reliability determination units 15-1 to 15-*n* corresponding to each other. The number of the sets of the environmental information acquiring units 11-1 to 11-$n$, the important information specifying units 12-1 to 12-$n$, the calculation units 13-1 to 13-$n$, the contribution information specifying units 14-1 to 14-$n$, and the reliability determination units 15-1 to 15-$n$ corresponding to each other is the same as the number of controls performed by the vehicle control apparatus 100 in accordance with the calculation results based on the models. Note that, specific operations of the environmental information acquiring units 11-1 to 11-$n$, the important information specifying units 12-1 to 12-$n$, the calculation units 13-1 to 13-$n$, the contribution information specifying units 14-1 to 14-$n$, and the reliability determination units 15-1 to 15-$n$ are similar to the specific operations of the environmental information acquiring unit 11, the important information specifying unit 12, the calculation unit 13, the contribution information specifying unit 14, and the reliability determination unit 15 described with reference to FIG. 1, and therefore the duplicated description will be omitted.

In the vehicle control calculation device 1 shown in FIG. 5, each of the environmental information acquiring units 11-1 to 11-$n$ is not required to acquire the environmental information of the same type. Each of the environmental information acquiring units 11-1 to 11-$n$ may appropriately determine the type of the environmental information to be acquired depending on the calculation performed by the corresponding one of the calculation units 13-1 to 13-$n$.

The calculation units 13-1 to 13-$n$ perform, for respective controls performed by the vehicle control apparatus 100 in accordance with the calculation results based on the models, calculations related to the controls on the basis of environmental information acquired by the corresponding environmental information acquiring units 11-1 to 11-$n$. The calculation units 13-1 to 13-$n$ perform, depending on respective types of calculation related to control, calculations on the basis of corresponding models. Therefore, in the vehicle control calculation device 1 shown in FIG. 5, a plurality of types of models are prepared corresponding to the respective calculations related to the plurality of types of control.

The important information specifying units 12-1 to 12-$n$ specify important environmental information among the environmental information acquired by the corresponding environmental information acquiring units 11-1 to 11-$n$ for the respective calculations performed by the corresponding calculation units 13-1 to 13-$n$.

The contribution information specifying units 14-1 to 14-$n$ specify the contribution environmental information from among the environmental information used for the calculations by the corresponding calculation units 13-1 to 13-$n$.

The reliability determination units 15-1 to 15-$n$ compare the important environmental information specified by the corresponding important information specifying units 12-1 to 12-$n$ with the contribution environmental information specified by the corresponding contribution information specifying units 14-1 to 14-$n$, and thereby determine degrees of reliability of the calculation results output by the corresponding calculation units 13-1 to 13-$n$, respectively.

Even when the configuration of the vehicle control calculation device 1 is as shown in FIG. 5, the operation of the vehicle control calculation device 1 is similar to the operation described using the flowchart of FIG. 2, and therefore detailed description will be omitted.

In the vehicle control calculation device 1 as shown in FIG. 5, each of the environmental information acquiring units 11-1 to 11-$n$, each of the important information specifying units 12-1 to 12-$n$, each of the calculation units 13-1 to 13-$n$, each of the contribution information specifying units 14-1 to 14-$n$, and each of the reliability determination units 15-1 to 15-$n$ perform the operations of steps ST201 to ST205, individually.

Figure 6:
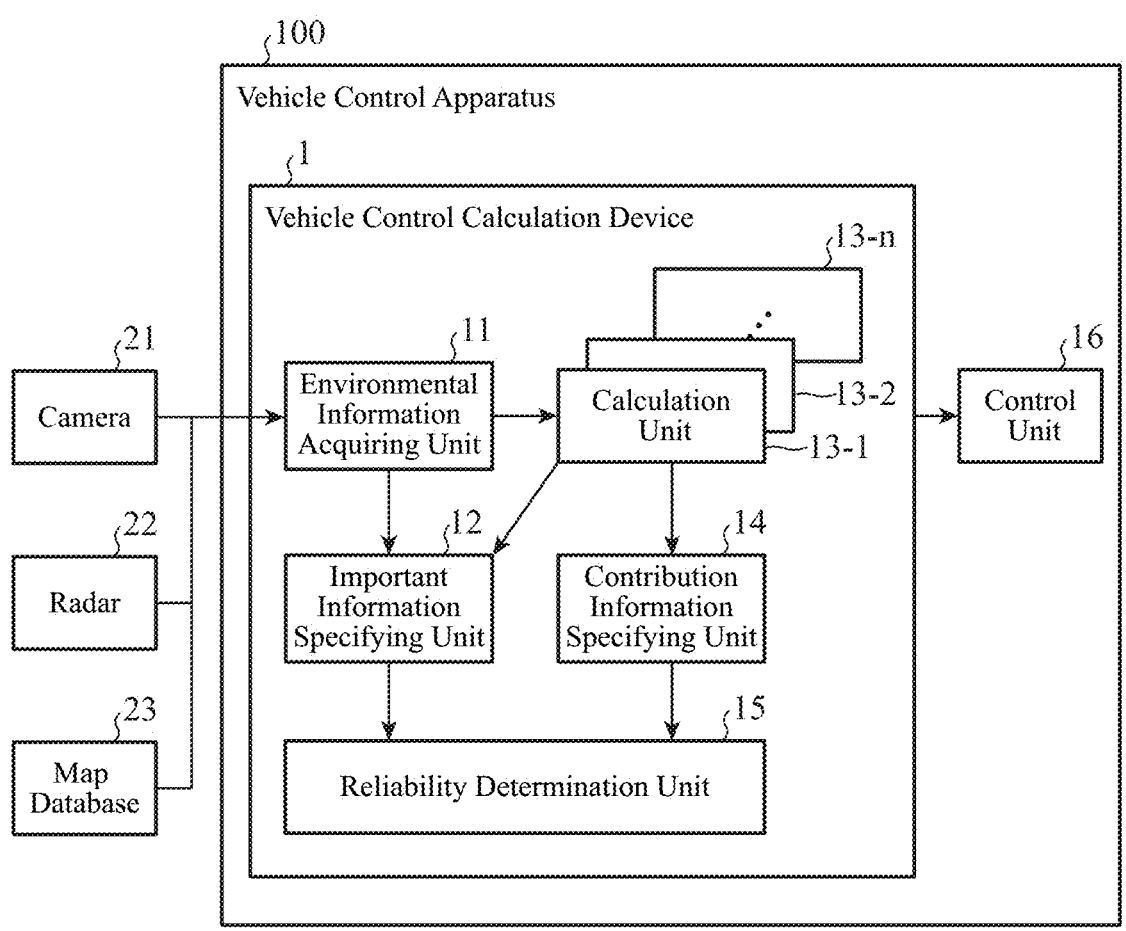
FIG. 6 is a diagram showing another configuration example of the vehicle control apparatus in which the vehicle control calculation device performs a plurality of calculations for performing a respective plurality of types of control on the vehicle in the first embodiment.

FIG. 6 is a diagram showing another configuration example of the vehicle control apparatus 100 in which the vehicle control calculation device 1 performs a plurality of calculations for performing a respective plurality of types of control on the vehicle in the first embodiment.

As shown in FIG. 6, the vehicle control calculation device 1 can include one environmental information acquiring unit 11, one important information specifying unit 12, one contribution information specifying unit 14, one reliability determination unit 15, and a plurality of calculation units 13-1 to 13-$n$. Note that, the specific operations of the environmental information acquiring unit 11, the important information specifying unit 12, the calculation units 13-1 to 13-$n$, the contribution information specifying unit 14, and the reliability determination unit 15 are similar to the specific operations of the environmental information acquiring unit 11, the important information specifying unit 12, the calculation unit 13, the contribution information specifying unit 14, and the reliability determination unit 15 described with reference to FIG. 1, and therefore duplicate explanations will be omitted.

It is assumed that the environmental information acquiring unit 11 outputs the environmental information of the same type to each of the calculation units 13-1 to 13-$n$.

The calculation units 13-1 to 13-$n$ perform, for respective controls performed by the vehicle control apparatus 100 in accordance with the calculation results based on the models, calculations related to the controls. The calculation units 13-1 to 13-$n$ perform, depending on respective types of calculation related to control, calculations on the basis of corresponding models. Therefore, in the vehicle control calculation device 1 shown in FIG. 6, a plurality of types of models are prepared corresponding to the respective calculations related to the plurality of types of control.

In the vehicle control calculation device 1 as shown in FIG. 6, each of the calculation units 13-1 to 13-$n$, when outputting the calculation result to the contribution information specifying unit 14 and the control unit 16, attaches information which makes it possible to identify which calculation related to control is performed to obtain the calculation result (hereinafter referred to as "calculation identification information"), to the calculation result. In addition, each of the calculation units 13-1 to 13-$n$ outputs the calculation identification information to the important information specifying unit 12.

The important information specify unit 12 specifies important environmental information among the environmental information acquired by the environmental information acquiring unit 11-1 to 11-$n$ for each of the calculations performed by the calculation units 13-1 to 13-$n$. The important information specifying unit 12 identifies the calculations performed by the calculation units 13-1 to 13-$n$ on the basis of the calculation identification information output from the calculation units 13-1 to 13-$n$, and for each of the identified calculations, specifies the important environmental information by switching the method of specifying important environmental information.

The contribution information specifying unit 14 specifies the contribution environmental information from among the environmental information used for the calculations by the corresponding calculation units 13-1 to 13-$n$. The contribution information specifying unit 14 identifies which calculation is performed to obtain the calculation result on the basis of the calculation identification information output from each of the calculation units 13-1 to 13-n, and specifies the contribution environmental information for the identified calculation.

The reliability determination unit 15 compares the important environmental information specified by the important information specifying unit 12 with the contribution environmental information specified by the contribution information specifying unit 14, and thereby determines the degree of reliability of the calculation result output by the corresponding one of the calculation units 13-1 to 13-n, individually.

Even when the configuration of the vehicle control calculation device 1 is as shown in FIG. 6, the operation of the vehicle control calculation device 1 is similar to the operation described with reference to the flowchart of FIG. 2, and therefore detailed description will be omitted.

However, the vehicle control calculation device 1 as shown in FIG. 6 performs, in the flowchart of FIG. 2, the operation of step ST202 after the operation of step ST203.

In the vehicle control calculation device 1 as shown in FIG. 6, each of the calculation units 13-1 to 13-n performs the operation of step ST203.

As described above, in the first embodiment, the vehicle control calculation device 1 can perform a plurality of calculations for performing a plurality of types of control on the vehicle, by having the configurations as shown in FIGS. 4 to 6. Then, the vehicle control apparatus 100 can perform the plurality of types of control in accordance with the calculation results by the vehicle control calculation device 1 which correspond to the respective plurality of types of control.

Figure 7A:
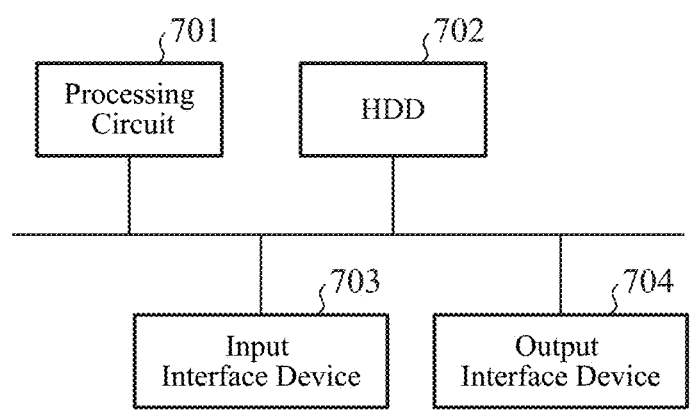
FIGS. 7A and 7B are diagrams each showing an example of a hardware configuration of the vehicle control apparatus according to the first embodiment.
Figure 7B:
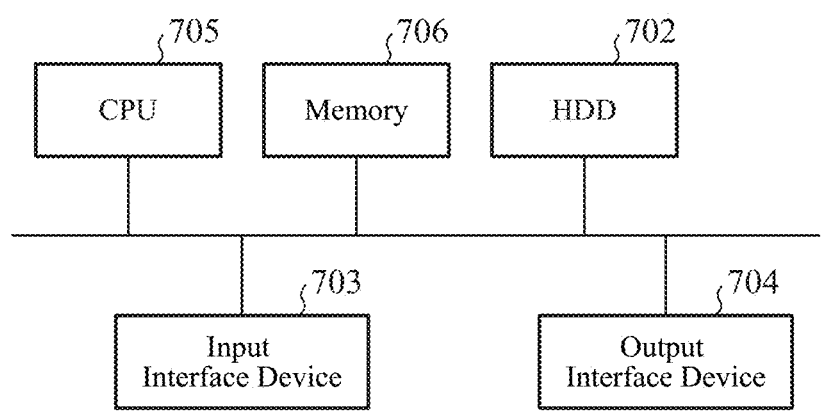

FIGS. 7A and 7B are diagrams each showing an example of the hardware configuration of the vehicle control apparatus 100 according to the first embodiment.

In the first embodiment, the functions of the environmental information acquiring units 11, 11-1 to 11-n, the important information specifying units 12, 12-1 to 12-n, the calculation units 13, 13-1 to 13-n, the contribution information specifying units 14, 14-1 to 14-n, the reliability determination units 15, 15-1 to 15-n, and the control unit 16 are implemented by a processing circuit 701. That is, the vehicle control apparatus 100 includes the processing circuit 701 for performing vehicle control in accordance with the calculation result based on the model.

The processing circuit 701 may be dedicated hardware as shown in FIG. 7A, or may be a Central Processing Unit (CPU) 705 which executes a program stored in a memory 706 as shown in FIG. 7B.

When the processing circuit 701 is dedicated hardware, for example, a single circuit, a composite circuit, a programmed processor, a parallel-programmed processor, an Application Specific Integrated Circuit (ASIC), a Field-Programmable Gate Array (FPGA), or a combination thereof corresponds to the processing circuit 701.

When the processing circuit 701 is the CPU 705, the functions of the environmental information acquiring units 11, 11-1 to 11-n, the important information specifying units 12, 12-1 to 12-n, the calculation units 13, 13-1 to 13-n, the contribution information specifying units 14, 14-1 to 14-n, the reliability determination units 15, 15-1 to 15-n, and the control unit 16 are implemented by software, firmware, or a combination of software and firmware. That is, the environmental information acquiring units 11, 11-1 to 1-n, the important information specifying units 12, 12-1 to 12-n, the calculation units 13, 13-1 to 13-n, the contribution information specifying units 14, 14-1 to 14-n, the reliability determination units 15, 15-1 to 15-n, and the control unit 16 are implemented by the CPU 705 that executes programs stored in a Hard Disk Drive (HDD) 702, the memory 706, etc., or a processing circuit such as a system Large-Scale Integration (LSI). In addition, it can be also said that the programs stored in the HDD 702, the memory 706, etc. cause a computer to execute procedures or methods performed in the environmental information acquiring units 11, 11-1 to 11-n, the important information specifying units 12, 12-1 to 12-n, the calculation units 13, 13-1 to 13-n, the contribution information specifying units 14, 14-1 to 14-n, the reliability determination units 15, 15-1 to 15-n, and the control unit 16. Here, the memory 706 is, for example, a nonvolatile or volatile semiconductor memory, such as a RAM, a Read Only Memory (ROM), a flash memory, an Erasable Programmable Read Only Memory (EPROM), and an Electrically Erasable Programmable Read Only Memory (EEPROM), a magnetic disk, a flexible disk, an optical disk, a compact disk, a mini disk, a Digital Versatile Disc (DVD), or the like.

Note that, the functions of the environmental information acquiring units 11, 11-1 to 11-n, the important information specifying units 12, 12-1 to 12-n, the calculation units 13, 13-1 to 13-n, the contribution information specifying units 14, 14-1 to 14-n, the reliability determination units 15, 15-1 to 15-n, and the control unit 16 may be partially implemented by dedicated hardware and partially by software or firmware. For example, the functions of the environmental information acquiring units 11, 11-1 to 11-n can be implemented by the processing circuit 701 as dedicated hardware, and the functions of the important information specifying units 12, 12-1 to 12-n, the calculation units 13, 13-1 to 13-n, the contribution information specifying units 14, 14-1 to 14-n, the reliability determination units 15, 15-1 to 15-n, and the control unit 16 can be implemented by the processing circuit reading and executing programs stored in the memory 706.

Further, the vehicle control apparatus 100 includes an input interface device 703 and an output interface device 704 that perform wired communication or wireless communication with a device such as the camera 21, the radar 22, or the map database 23.

As described above, according to the first embodiment, the vehicle control calculation device 1 includes: the environmental information acquiring unit 11, 11-1 to 11-n for acquiring one or more pieces of environmental information on the environment around the vehicle; the important information specifying unit 12,12-1 to 12-n for specifying the important environmental information necessary for vehicle control among the pieces of environmental information acquired by the environmental information acquiring unit 11, 11-1 to 11-n; the calculation unit 13, 13-1 to 13-n for performing a calculation related to vehicle control on the basis of the pieces of environmental information acquired by the environmental information acquiring unit 11, 11-1 to 11-n, and a trained model in which machine learning for outputting the calculation result related to vehicle control has been performed in advance using preliminarily acquired environmental information as an input; the contribution information specifying unit 14, 14-1 to 14-n for specifying the contribution environmental information having a high degree of contribution to the calculation in a process of the calculation among the pieces of environmental information used for the calculation by the calculation unit 13, 13-1 to 13-n; and the reliability determination unit 15, 15-1 to 15-n for determining a degree of reliability of the result of the calculation performed by the calculation unit 13, 13-1 to 13-$n$ by comparing the important environmental information specified by the important information specifying unit 12, 12-1 to 12-$n$ with the contribution environmental information specified by the contribution information specifying unit 14, 14-1 to 14-$n$. Therefore, the vehicle control calculation device 1 can determine whether or not the calculation result based on the model is reliable for use in vehicle control.

Further, the vehicle control apparatus 100 includes the vehicle control calculation device 1 as described above, and the control unit 16 for controlling the vehicle in accordance with the result of the calculation (calculation result) performed by the calculation unit 13, 13-1 to 13-$n$ and the degree of reliability determined by the reliability determination unit 15, 15-1 to 15-$n$ in the vehicle control calculation device 1. Therefore, the vehicle control apparatus 100 can control the vehicle in accordance with the calculation result which is based on the model, and which is reliable for use in vehicle control.

It should be noted that the invention of the present application is capable of modifying any component of the embodiment or omitting any component of the embodiment within the scope of the invention.

INDUSTRIAL APPLICABILITY

The vehicle control calculation device according to the present invention is configured to be able to determine whether or not the calculation result based on the model is reliable for use in vehicle control, so that it can be applied to a control device for vehicle control that performs calculation to control a vehicle.

REFERENCE SIGNS LIST

1: vehicle control calculation device, 11, 11-1 to 11-$n$: environmental information acquiring unit, 12, 12-1 to 12-$n$: important information specifying unit, 13, 13-1 to 13-$n$: calculation unit, 14, 14-1 to 14-$n$: contribution information specifying unit, 15, 15-1 to 15-$n$: reliability determination unit, 16: control unit, 21: camera, 22: radar, 23: map database, 100: vehicle control apparatus, 701: processing circuit, 702: HDD, 703: input interface device, 704: output interface device. 705: CPU, 706: memory

The invention claimed is:
1. A vehicle control calculation device comprising:
processing circuitry, the processing circuitry configured to:
acquire at least one group of one or more pieces of environmental information on an environment around a vehicle;
specify, as an important environmental information image, important environmental information necessary for control of the vehicle among the pieces of environmental information acquired, by using a rule predetermined by a human developer;
perform a calculation related to the control of the vehicle on a basis of the pieces of environmental information acquired, and a first trained model in which machine learning for outputting a calculation result related to the control of the vehicle has been performed in advance using preliminarily acquired environmental information as an input;
specify, based on the calculation related to the control of the vehicle, a contribution environmental information image; and
determine a degree of reliability of a result of the calculation by comparing the important environmental information image with the contribution environmental information image.

2. The vehicle control calculation device according to claim 1, wherein the first trained model is obtained as a result of machine learning by a neural network.

3. The vehicle control calculation device according to claim 1, wherein the processing circuitry is configured to perform a plurality of controls with respect to the vehicle.

4. The vehicle control calculation device according to claim 3, wherein a plurality of trained models comprises the first trained model, and wherein the processing circuitry performs a plurality of calculations corresponding respectively to the plurality of controls of the vehicle,
each of the calculations is performed on a basis of a corresponding one of the groups, and a corresponding one of the plurality of trained models for the respective calculations,
the processing circuitry specifies the important environmental information image depending on each of the calculations,
the processing circuitry specifies, based on the process of the calculations, the contribution environmental information image, and
the processing circuitry compares the specified important environmental information image in each of the processes with the specified contribution environmental information image in a corresponding one of the processes, and thereby determines a degree of reliability of a result of a corresponding one of the calculations.

5. A vehicle control apparatus comprising:
the vehicle control calculation device according to claim 1, wherein
the processing circuitry controls the vehicle in accordance with the result of the calculation and the determined degree of reliability.

6. The vehicle control calculation device of claim 1, wherein the processing circuitry is further configured to specify the contribution environmental information image based on: i) a predetermined threshold, ii) an effect of a variation of the environmental information, iii) a back-calculation in the first trained model, or iv) a second rule.

7. The vehicle control calculation device of claim 1, wherein the processing circuitry is further configured to determine the degree of reliability by determining an agreement of a first luminance value of a first pixel of the important environmental information image with respect to a second luminance of a second pixel of the contribution environmental information image.

8. The vehicle control calculation device of claim 7, wherein the first luminance value is proportional to a percentage estimate of importance.

9. The vehicle control calculation device of claim 7, wherein the second luminance value is proportional to a percentage estimate of contribution.

10. The vehicle control calculation device according to claim 1, wherein the reliability is expressed as a value of "high" or "low," and wherein if all pieces of information that are specified important environmental information image are included in the contribution environmental information image, the degree of reliability is "high," otherwise the degree of reliability is "low".

11. The vehicle control calculation device according to claim 1, wherein the reliability is expressed as a percentage, and wherein the percentage is based on a ratio of first information of the contribution environmental information image with respect to second information of the important environmental information image.

12. A vehicle control calculation method comprising:
acquiring one or more pieces of environmental information on an environment around a vehicle;
specifying, as an important environmental information image, important environmental information necessary for control of the vehicle among the pieces of environmental information acquired, by using a rule predetermined by a human developer;
performing a calculation related to the control of the vehicle on a basis of the pieces of environmental information acquired, and a trained model in which machine learning for outputting a calculation result related to the control of the vehicle has been performed in advance using preliminarily acquired environmental information as an input;
specifying, based on the calculation related to the control of the vehicle, a contribution environmental information image; and
determining a degree of reliability of a result of the calculation by comparing the important environmental information image with the contribution environmental information image.

* * * * *